United States Patent
Steele

[19]

[11] Patent Number: 5,826,900
[45] Date of Patent: Oct. 27, 1998

[54] VEHICLE FOOT PEG

[76] Inventor: Robert Steele, P.O. Box 151, Nemo, S. Dak. 57759-0151

[21] Appl. No.: 711,979

[22] Filed: Sep. 10, 1996

[51] Int. Cl.$^6$ ..................................................... B62J 25/00
[52] U.S. Cl. ................................ 280/291; 182/91; 296/75
[58] Field of Search ................................. 280/291, 288.4;
74/564; 180/219; 297/423.18, 423.24, 423.35,
423.34, 423.26, 423.25; 182/91; 296/75;
D6/501; D12/203, 110, 307

[56] References Cited

U.S. PATENT DOCUMENTS

| | | | |
|---|---|---|---|
| 4,174,852 | 11/1979 | Panzica et al. | 280/291 |
| 4,546,993 | 10/1985 | Walker | 280/291 |
| 4,591,179 | 5/1986 | Nakamura | 280/291 |

FOREIGN PATENT DOCUMENTS

| | | | |
|---|---|---|---|
| 927133 | 4/1955 | Germany | 280/291 |
| 474881 | 10/1952 | Italy | 280/291 |
| 83116 | 9/1956 | Netherlands | 280/291 |
| 372260 | 5/1932 | United Kingdom | 280/291 |

*Primary Examiner*—Anne Marie Boehler
*Attorney, Agent, or Firm*—Gene R. Woodle

[57] ABSTRACT

A vehicle foot peg is disclosed for use with a motorcycle, ATV, or similar vehicle. The vehicle foot pegs are used in pairs and attached to the supplied foot peg brackets on the vehicle. The vehicle foot pegs are configured such that the outer ends of the pegs are angled rearward allowing the rider to rest the feet on the pegs in a natural and comfortable position with the toes slightly outward.

4 Claims, 2 Drawing Sheets

VEHICLE FOOT PEG

BACKGROUND OF THE INVENTION

1. Field of the Invention

The present invention relates generally foot pegs for motorcycles and other, similar vehicles and more particularly to a rearward angling foot peg which provides for improved operator or passenger comfort.

2. Background Information

There are millions of motorcycles, all terrain vehicles (ATV's), and similar vehicles in operation in the United States and throughout the world. In most instances the operators of these vehicles and any passengers ride in a relatively upright position sitting upon a saddle type seat with their legs astride the vehicle. In nearly every case the vehicle is supplied with some form of foot rest upon which the operator or passenger may rest their feet while riding the vehicle. These foot rests are variously known as foot pegs, foot rests, bar steps, and floorboards.

Foot pegs are widely known in the prior art and include a variety of styles and shapes. The simplest form of foot peg is a short, metal bar attached to the frame of the vehicle and protruding away from the frame at a right angle. Somewhat more sophisticated foot pegs include a hinge at the attachment point which allows the foot peg to be flipped up when not in use and to prevent damage in the event the vehicle tips or falls sideways.

Several foot pegs have been patented. The patent issued to Nakamura (U.S. Pat. No. 4,591,179; May 27, 1986) provides an example a typical foot peg which flips up. The patent discloses a foot peg for small vehicles such as dirt bikes and ATV's. The foot peg has two parts, a metal peg with upward facing teeth and a peg made of rubber or a similar material which fits within the metal peg. Both pegs rotate about a pin in a bracket attached to the vehicle so that they may be placed in either a down, in use, position or in an up position. The pegs may be arranged so that the rubber peg is up and the metal peg down for off-road operation and with both pegs down for on-road operation.

The patent issued to Walker (U.S. Pat. No. 4,546,993; Oct. 15, 1985) discloses an adjustable motorcycle passenger floorboard. A tubular mounting bracket is provided which is attached to the motorcycle. The peg or floorboard is mounted to the mounting bracket by means of a peg bracket. The peg bracket may be slid along the mounting bracket until the peg or floor-board is in the appropriate position and then fastened in position. Essentially, this allows the passenger peg to be adjusted to accommodate different motorcycles and different passengers.

The patent issued to Panzica et al. (U.S. Pat. No. 4,174,852; Nov. 20, 1979) discloses another foot rest assembly for a motorcycle. This device is attached to the motorcycle by means of a mounting bracket. The outer portion of the mounting bracket has the shape of a box with an open top and an open outer wall. A bar is attached to the mounting bracket by a pivot pin. The foot peg is attached to the bar by means of a second pivot pin. The second pivot pin is horizontal and the foot peg may rotate about the second pivot pin so that it is either horizontal or vertical. In addition, the bar and foot peg may rotate upward about the first pivot pin. The first pivot pin is not horizontal, but the effect of the angle of first pivot pin is to allow the bar and foot peg to flip up at an angle and not to place the foot peg at an outward angle when in use.

The major problem which is presented by known, prior art foot pegs is the angle at which the feet of the operator or passenger rest. A person riding upon a motorcycle, ATV, or similar vehicle ordinarily is sitting astride the frame and engine of the vehicle. When in this position the most natural and comfortable alignment of the feet is with the toes pointed slightly outward. Conventional, prior art, foot pegs protrude at right angles from the longitudinal axis of the vehicle which either forces the feet into an unnatural and uncomfortable position parallel to the longitudinal axis of the vehicle or to rest upon the pegs at an unnatural and uncomfortable angle.

The instant invention is a vehicle foot peg which is unique, original, and fills the need for a new and improved vehicle foot peg. The instant invention provides for greatly increased operator or passenger comfort by providing a vehicle foot peg which angles rearward from the vehicle, allowing the feet to be rested at a much more natural and comfortable angle than conventional foot pegs.

The ideal vehicle foot peg provides a place for operators and passenger to rest their feet which allows the feet to rest in a natural and comfortable position. The ideal vehicle foot peg should also be simple, lightweight, compact, easy to use, and inexpensive.

SUMMARY OF THE INVENTION

The present invention provides a vehicle foot peg which may be attached to a motorcycle, ATV, or similar vehicle. The vehicle foot peg angles rearward which allows the operator of a motorcycle, ATV, or similar vehicle or the passenger to rest their feet on the foot peg in a position which is both more natural and comfortable than a conventional foot peg.

The vehicle foot peg includes a peg assembly which comprises a core, a cover, and a hinge. The core has a generally cylindrical shape and the hinge protrudes from the core along the longitudinal axis of the core. The cover completely encloses the core except for the hinge. The vehicle foot peg also includes a clevis assembly which comprises a pin, a cotter pin, a pin hole, a hinge slot, and a threaded opening. The hinge fits within the hinge slot and the peg assembly is held in place on the clevis assembly by the pin which is inserted through the pin hole, a hole in the hinge, and the hinge slot. The pin is held in place by the cotter pin.

The vehicle foot peg is attached to the vehicle by a bolt which passes through the supplied hole in the conventional foot peg mounting bracket and screws into the threaded opening in the clevis assembly.

The peg assembly may then rotated about the hinge and flipped up into a vertical position or down into a horizontal, in use, position. A fluke on the bottom of the hinge contacts the inner face of the hinge slot when the peg is in the horizontal and prevents the peg from rotating downward and passed the horizontal position.

One of the major unique and original features of the vehicle foot peg is the configuration of the clevis assembly. At the point where the clevis assembly is attached to the vehicle it protrudes outward from the vertical plane of the vehicle at a right angle. However, the portion of the clevis assembly away from the vehicle is angled rearward. As a result the peg assembly is also angled rearward. This allows the operator of the vehicle or the passenger to rest the foot upon the peg assembly comfortably with the toes pointing slightly outward in a natural position.

One foot peg has been described above, but vehicle foot pegs would typically be used in pairs, one for each foot, with each foot peg being a mirror image of the other.

In another embodiment the clevis assembly of the vehicle foot peg includes a threaded stud in place of the threaded opening. The vehicle foot peg is attached to the vehicle by inserting the stud through the supplied hole in the conventional foot peg mounting bracket and placing a nut onto the threaded stud.

In another embodiment the clevis assembly does not include the rearward angle, but the hinge on the peg assembly is angled so that the peg assembly angles rearward when the vehicle foot peg is attached to the vehicle.

One of the major objects of the present invention is to provide foot pegs which may be used on motorcycles, ATV's and similar vehicles and which allow the operator of the vehicle or a passenger to rest their feet upon the foot pegs in a natural and comfortable position.

Another objective of the present invention is to provide foot pegs which may be used on motorcycles, ATV's and similar vehicles and which are angle rearward.

Another objective of the present invention is to provide foot pegs which are simple, lightweight, compact, easy to use, and inexpensive.

These and other features of the invention will become apparent when taken in consideration with the following detailed description and the drawings.

DESCRIPTION OF A PREFERRED EMBODIMENT

Figure 1:
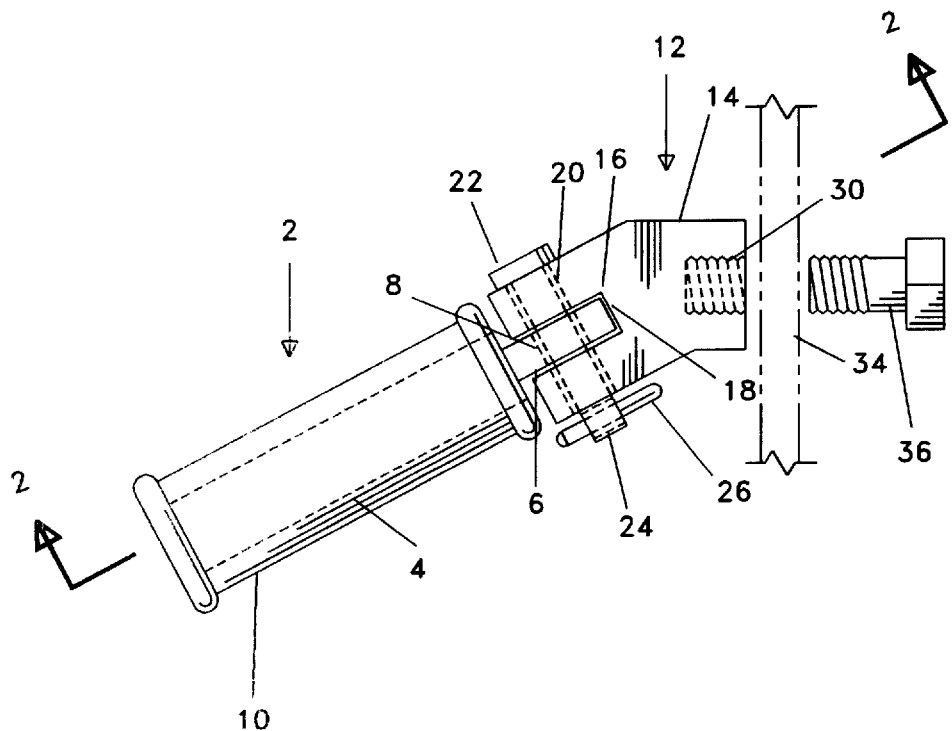
FIG. 1 is a top view of a preferred form of one of a pair of the vehicle foot pegs of the present invention.
Figure 2:
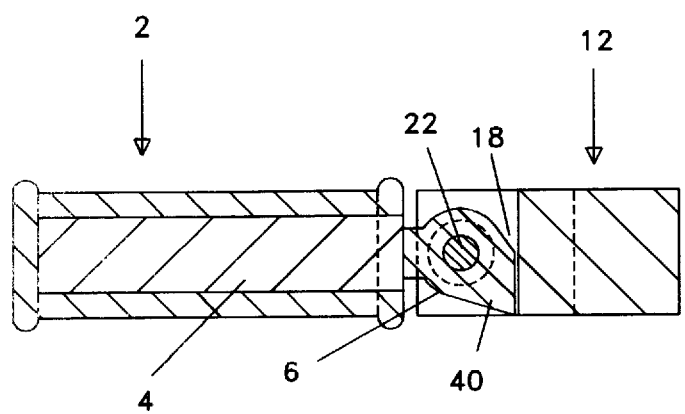
FIG. 2 is a sectional view of a preferred form of the present invention taken along line 2—2 of FIG. 1.
Figure 3:
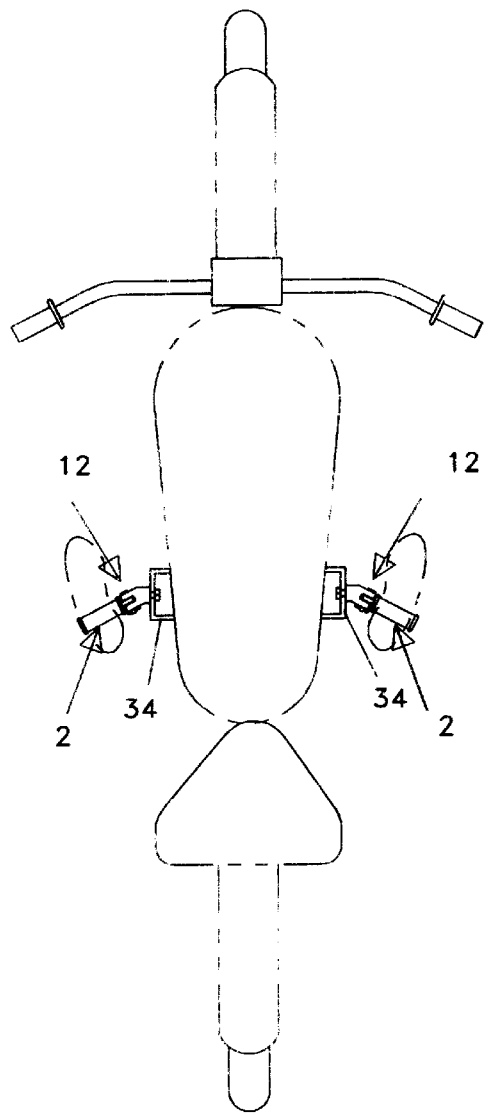
FIG. 3 is a top view of a motorcycle showing the vehicle foot pegs of the present invention attached to the vehicle.

Referring to the drawings, FIGS. 1 through 3, there is shown a preferred form of the vehicle foot peg embodying the present invention. Referring to the drawings, FIGS. 5 and 6, there is shown two other embodiments of the vehicle foot peg of the present invention.

Referring to FIG. 1, a top view of a preferred form of a vehicle foot peg of the present invention is shown. There is a peg assembly 2 which includes a core 4, a hinge 6, a hinge hole 8, and a cover 10. The core 4 has a generally cylindrical shape. The hinge 6 protrudes from one end of said core 4. Said hinge 6 has the general shape of a short cylinder with its longitudinal axis horizontal and perpendicular to the longitudinal axis of said core 4. The cover 10 completely encloses said core 4 with the exception of the end of said core 4 from which said hinge 6 protrudes. Said cover 10 has the same general shape as said core 4 and a slightly large diameter.

Still referring to FIG. 1, a clevis assembly 12 is also provided which includes a body 14, a hinge slot 16, a stop face 18, a slot hole 20, a pin 22, a pin hole 24, a cotter pin 26, a cotter pin hole 28, and a threaded hole 30. The hinge slot 16 is a vertical opening in one end of the body 14 having a width slightly larger than the width of said hinge 6. The stop face 18 is the innermost face of said hinge slot 16. The slot hole 20 is a horizontal hole through the end of said body 14 which includes said hinge slot 16 and is aligned with and perpendicular to said hinge slot 16. Said hinge 6 is inserted into said hinge slot 16 and pin 22 is inserted through said slot hole 20, said hinge hole 8, and said hinge slot 16. Said pin 22 holds said peg assembly 2 in place within said hinge slot 16. Said pin 22 has a head on one end and the cotter pin hole 28 on the other. Said cotter pin hole 28 is perpendicular to the longitudinal axis of said pin 22. The cotter pin 26 is inserted through said cotter pin hole 28 to hold said pin 22 in place.

Still referring to FIG. 1, threaded hole 30 is in the end of said body 14 opposite said hinge slot 16. Said body 14 is angled such that the face of said body 14 which includes said threaded hole 30 is at an angle of approximately 22 degrees from the face of said body 14 which includes said hinge slot 16. Peg bracket 34 represents the conventional foot peg mounting system found in various forms on nearly every conventional motorcycle, ATV, and similar vehicle. Such peg brackets 34 customarily are attached to the frame of the vehicle and include a hole for the mounting of foot pegs. Said peg bracket 34 is shown in phantom lines and is not considered a part of the instant invention. A bolt 36 is provided and the vehicle foot peg of the instant invention may be attached to a motor vehicle by inserting the bolt 36 through the provided hold in said peg bracket 34 and screwing said bolt 36 into said threaded hole 30.

Referring now to FIG. 2, a sectional view of a preferred form of a vehicle foot peg of the instant invention taken along line 2—2 of FIG. 1 is shown. There is a fluke 40 having a generally triangular shape on the bottom quadrant of said hinge 6 nearest said stop face 18. Said peg assembly is rotatable about said pin 22 and may be flipped up to a vertical position. If said peg assembly is rotated downward to a horizontal position, the fluke 40 contacts said stop face 18 and prevents said peg assembly from rotating downward passed the horizontal position.

Referring now to FIG. 3, a top view of a motorcycle showing the vehicle foot pegs of the present invention attached to the vehicle is shown. The motorcycle is shown in phantom lines and represents motorcycles, ATV'S, and similar vehicles to which the vehicle foot pegs of the instant invention may be attached. The motorcycle is not considered a part of the instant invention. As shown said clevis assemblies 12 are attached to said peg brackets 34 and said peg assemblies 2 are attached to said clevis assemblies 12. Although only one of the vehicle foot pegs of the instant invention has been described above, the vehicle foot pegs are ordinarily used in pairs. The above description should be considered to apply to a pair of vehicle foot pegs each of which is a mirror image of the other with the mirror plane being taken along a vertical plane along the longitudinal axis of the vehicle. Because of the angled configuration of said bodies 14, said peg assemblies 2 are angled rearward with the outer ends of said peg assemblies 2 angled toward the rear of the vehicle. This unique feature allows a vehicle rider to rest the feet upon said peg assemblies 2 with the toes pointed slightly outward as shown in FIG. 3 and provides a much more natural and comfortable foot position than conventional foot pegs. Although one pair is vehicle foot pegs is shown, a plurality of vehicle foot pegs could be used for both operators and passengers.

Figure 4:
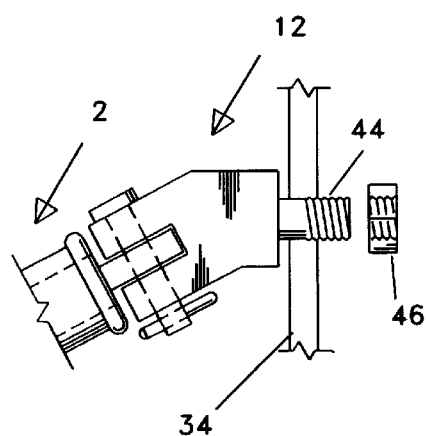
FIG. 4 is a top view of a second embodiment of one of a pair of the vehicle foot pegs of the present invention.

Referring now to FIG. 4, a top view of a second embodiment of the vehicle foot peg of the instant invention is shown. In place of the threaded hole 30 described above, said body 14 includes a threaded stud 44 which protrudes from the face of said body 14 opposite said hinge slot 16. In this embodiment the vehicle foot peg is attached to said peg bracket 34 by inserting the threaded stud 44 through the hold in said peg bracket 34 and threading a nut 46 onto the end of said threaded stud 44.

Figure 5:
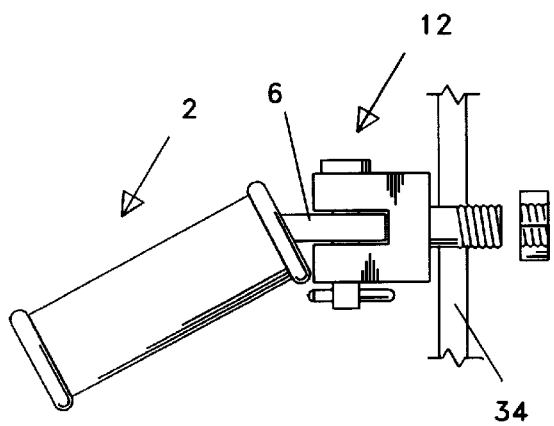
FIG. 5 is a top view of a third embodiment of one of a pair of the vehicle foot pegs of the present invention.

Referring now to FIG. 5, a top view of a third embodiment of the vehicle foot peg of the instant invention is shown. In the preferred embodiment described above said peg assembly 2 is angled rearward by the angled configuration of said body 14. In this embodiment of the vehicle foot peg this rearward angle is achieved by having a straight body 14 and having said hinge 6 protrude at an angle of approximately 22 degree from said core 4.

In the preferred embodiment of the instant invention said core 4, said hinge 6, said fluke 40, and said body 14 are made from steel; but other materials having sufficient strength, durability, and rust resistance including aluminum and the like could be used. Said cover 10 is made from a tough, resilient plastic which is weather and oil resistant; but other materials having similar properties including rubber and the like could be used. Said pin 22, said cotter pin 26, said bolt 36, and said nut 46 are all conventional.

While preferred embodiments of this invention have been shown and described above, it will be apparent to those skilled in the art that various modifications may be made in these embodiments without departing from the spirit of the present invention. For that reason, the scope of the invention is set forth in the following claims:

I claim:

1. A vehicle foot peg in combination with a vehicle; the vehicle having a plane which is vertical and through the longitudinal axis of the vehicle and having a plurality of foot peg mounting brackets on either side of the vehicle comprising:

(a) a clevis having two vertical faces, an inner face and an outer face; the outer face being at an angle from the inner face such that said inner face is parallel with the plane of the vehicle and said outer face forms an acute angle with the plane of the vehicle measured from the rear of the vehicle;

(b) a peg having a longitudinal axis; and having two vertical faces, an inner face, and an outer face;

(c) means for attaching the peg to said clevis such that the longitudinal axis of said peg is perpendicular to said outer face of said clevis and said inner face of said peg is in proximity and parallel to said outer face of said clevis; and (d) means for attaching said clevis to the foot peg mounting brackets of the vehicle; whereby the vehicle foot peg may be attached to a vehicle and a person riding upon the vehicle may rest the feet upon the vehicle foot peg with the toes angled slightly outward.

2. The vehicle foot peg of claim 1 in which the means for attaching said peg to said clevis is a hinge such that said peg may be rotated about said hinge and placed in a vertical or horizontal position and a stop means is provided to prevent said peg from being rotated downward passed the horizontal position.

3. A vehicle foot peg for use with a vehicle; the vehicle having a plurality of foot peg mounting brackets on either side of the vehicle; and the vehicle foot peg being adapted to be connected to the foot peg mounting brackets comprising:

(a) a clevis having two vertical faces, an inner face and an outer face; the inner face being the face which is adapted to be connected to the foot peg mounting brackets and the clevis having a forward end and a rearward end;

(b) a peg having a longitudinal axis; and having two vertical faces, an inner face, and an outer face;

(c) means for attaching the peg to said clevis such that the longitudinal axis of said peg is perpendicular to said outer face of said clevis and said inner face of said peg is in proximity and parallel to said outer face of said clevis;

(d) means for attaching said clevis to the foot peg mounting brackets of the vehicle; and (e) said clevis being shaped such that the longitudinal axis of said foot peg forms an acute angle with the plane of said inner face of said clevis measured from the rearward end of said clevis;

whereby the vehicle foot peg may be attached to a vehicle and a person riding upon the vehicle may rest the foot upon the vehicle foot peg with the toes angled slightly outward.

4. The vehicle foot peg of 3 in which the means for attaching said peg to said clevis is a hinge such that said peg may be rotated about said hinge and placed in a vertical or horizontal position and a stop means is provided to prevent said peg from being rotated downward passed the horizontal position.

* * * * *